United States Patent [19]

Champeau

[11] Patent Number: 4,951,777
[45] Date of Patent: Aug. 28, 1990

[54] ALL-TERRAIN VEHICLE AXLE ASSEMBLY

[76] Inventor: Marc J. Champeau, 919 Bay Shore Dr., Sister Bay, Wis. 54234

[21] Appl. No.: 333,030

[22] Filed: Apr. 4, 1989

[51] Int. Cl.[5] ............................................... B60G 9/00
[52] U.S. Cl. .................................... 180/349; 280/111; 180/384; 403/121; 384/42
[58] Field of Search ...................... 280/111, 112.1, 113; 180/349, 340, 348, 217, 906, 383, 384; 248/580; 384/558, 42, 25; 403/111, 121; 301/125

[56] References Cited

U.S. PATENT DOCUMENTS 3,370,670  2/1968  Love .................................... 280/111
4,469,188  9/1984  Mita .................................... 180/217

FOREIGN PATENT DOCUMENTS 55-102714  8/1980  Japan ................................ 280/112.1

Primary Examiner—Charles A. Marmor
Assistant Examiner—Karin Tyson
Attorney, Agent, or Firm—H. Jay Spiegel

[57] ABSTRACT

The present invention relates to an improved all-terrain vehicle axle assembly allowing lateral movement of the axle while allowing the axle to rotate. The axle has a central elongated tooth portion which meshes with an arrower outer gear carried by a bearing mounted in a housing mounted attached to the frame of the associated vehicle. The bearing allows rotation of the axle while the sliding interengagement between the outer gear and the inner elongated tooth portion allows lateral movement of the axle with respect to the frame of the vehicle. The drive means for applying torque to the axle includes a similar elongated gear meshing with a narrower gear allowing torque to be imparted to the axle at all lateral positions thereof.

5 Claims, 1 Drawing Sheet

ALL-TERRAIN VEHICLE AXLE ASSEMBLY

BACKGROUND OF THE INVENTION

The present invention relates to an improved all-terrain vehicle axle assembly. In the prior art, all-terrain vehicles are well known to include mounting structure for the drive axles thereof which allows up and down and forward and backward movement. However, one of the problems with all-terrain vehicles is the instability which is magnified by operation of rough terrain where lateral forces are imparted to the vehicle when the vehicle travels over rocks and other uneven debris. Accordingly, a need has developed for an axle assembly for an all-terrain vehicle which will allow greater flexibility and compensation when engaging boulders and other uneven terrain features.

The following prior art is known to applicant:
U.S. Pat. No. 2,689,748 to Savery
U.S. Pat. No. 3,976,302 to Hammarstrand
U.S. Pat. No. 4,629,211 to Modglin, et al.
U.S. Pat. No. 4,687,225 to Newton Of the above-listed United States patents, Hammarstrand discloses a vehicle having axles which are pivotably mounted to the body of the vehicle and which thereby may not rotate. Modglin, et al. teach an axle which allows slight lateral movements but which does not, in and of itself, rotate.

Savery teaches a support axle which cannot move laterally and Newton teaches a fixed axle having structure therein including a shiftable mass to increase stability.

As stated hereinabove, none of these patents, taken alone or in combination with other references, teaches all of the aspects of the present invention as will be described in greater detail hereinafter.

SUMMARY OF THE INVENTION

The present invention relates to an improved all-terrain vehicle axle assembly. The invention includes the following interrelated aspects and features:

(a) In a first aspect, the inventive axle has a centrally-located elongated tooth portion having its lateral extremities defined by shoulders.

(b) A gear-like structure is slidably-mounted over the elongated tooth portion and has a lateral profile much narrower than the elongated tooth portion so that the gear-like structure may slide laterally on the elongated tooth portion of the axle. The gear-like structure has a central opening therethrough with a plurality of teeth designed to mesh with the elongated tooth portion to prevent relative rotation between the gear-like structure and the elongated tooth portion.

(c) The gear-like structure is mounted on a cylindrical bearing allowing rotation of the gear-like structure with respect thereto, with the cylindrical bearing being mounted in a bearing housing mounted on the frame of the associated vehicle.

(d) Means is provided for transmitting torque from the vehicle engine to the axle, which means includes two enmeshed gears, one of which is fixedly-mounted on the axle and the other of which is mounted on the frame of the vehicle and is connected through a train of power transfer to the vehicle engine. At least one of the gears which are meshed is elongated in lateral profile to the same degree as the elongation of the elongated tooth portion of the axle. In this way, as the axle moves laterally in response to forces impressed thereon by movements of the vehicle over rough terrain, continuous torque transmission will be achieved.

(e) Stabilizing means may be mounted between the axle and the frame to allow stabilization of the axle as mounted for lateral movement. The stabilizing means are provided to absorb shocks while allowing such lateral movement.

In a further aspect, if desired, tires which are mounted on the axle may be inflated to a relatively low pressure allowing a large area of tire surface to engage the terrain while allowing further shock absorbing capabilities.

As such, it is a first object of the present invention to provide an improved all-terrain vehicle axle assembly.

It is a further object of the present invention to provide such an improved all-terrain vehicle axle assembly which allows lateral movement of the axle with respect to the vehicle frame.

It is a still further object of the present invention to provide such an axle assembly with torque transmitting means which allows the transmission of torque at all lateral positions of the axle assembly with respect to the vehicle frame.

These and other objects, aspects and features of the pressent invention will be better understood from the following detailed description of the preferred embodiment when read in conjunction with the appended drawing figures.

SPECIFIC DESCRIPTION OF THE PREFERRED EMBODIMENT

Figure 1:
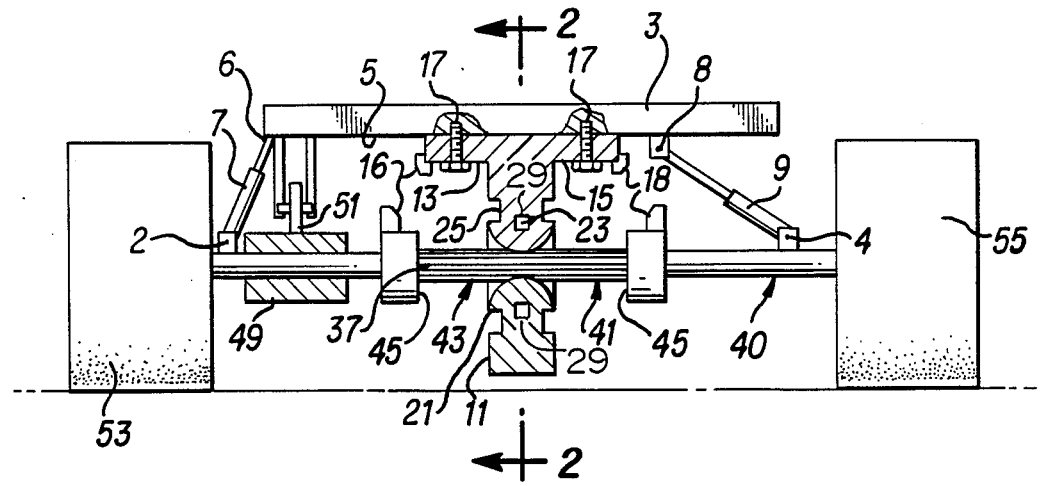
FIG. 1 shows a rear view of the invention as mounted on the frame of an all-terrain vehicle.

With reference, first, to FIG. 1, the vehicle 1 is seen to have a frame 3 on which the body of the vehicle (not shown) is mounted.

The frame 3 includes an undersurface 5 to which stabilization means 7 and 9 are mounted at joints 6 and 8.

The inventive axle assembly is generally designated by the reference numeral 10 and includes a bearing housing 11 mounted to the undersurface 5 of the frame 3 by virtue of flanges 13, 15 and suitable attachment means such as the bolts 17.

The bearing housing 11 has an opening 19 therein in which is mounted a cylindrical bearing 21 which may consist of a plurality of rollers 23. Alternatively, instead of the rollers 23, ball bearings (not shown) may be empolyed. The housing 11 is split at 12 and the housing halves are connected by bolts 14. As seen in FIG. 1, the opening 19 in the bearing housing 11 includes a groove 25 in which the members 23 ride. With further reference to FIG. 1, it is seen that a gear-like structure 27 includes an external groove 29 designed to capture the inner surfaces of the members 23 while the groove 25 in the bearing housing 11 captures the outer surfaces of the members 23. Thus, with the bearing 21 being interposed between the bearing housing 11 and the gear-like structure 27, the gear-like structure 27 may rotate with respect to the bearing housing 11.

Figure 2:
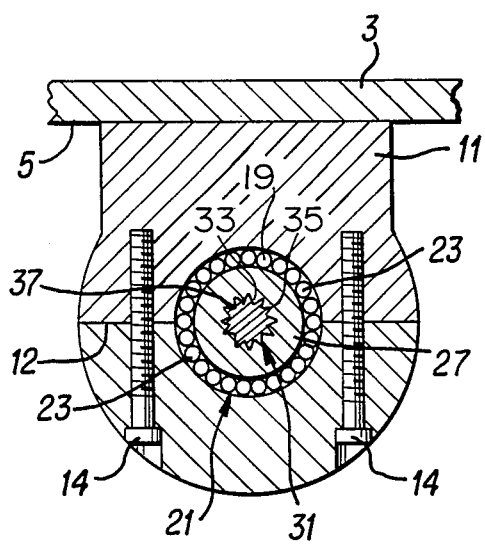
FIG. 2 shows a cross-sectional view along the line 2—2 of FIG. 1.

As best seen in FIG. 2, the gear-like structure 27 includes a central opening 31 which is defined by a plurality of teeth 33 and recesses 35 between the teeth.

The configuration of the opening 31 is made to precisely mesh with external teeth 37 formed on the outer surfaces of a central portion of the axle 40 best seen in FIG. 1.

As seen in FIG. 1, the axle 40 has a central location 41 having the elongated toothed portion 43 having the teeth 37 thereon. These teeth 37 are best seen in FIG. 2 to mesh with the recesses 35 and the teeth 33 of the gear-like structure 27 so that the gear-like structure 27 may move laterally along the centrally-located elongated toothed portion 43 of the axle 40 while always allowing torque transmission therebetween.

Shoulders 45 define the lateral extent on either side of the elongated toothed portion 43 and define limit stops limiting the amount of lateral movement of the axle 40 with respect to the gear-like structure 27. Mounted on the shoulders 45 and on the flanges 13, 15 are rubber stops 16, 18.

For the purposes of clarity, structure allowing assembly of the various above-described components together has been omitted. Thus, for example, the elongated toothed portion 43 may be split to form, for example, a threaded connection to facilitate mounting of the gear-like structure 27 thereon.

The stabilization means 7 and 9 are seen to be mounted to the axle 40 via mounting means 2 and 4. The stabilization means 7 and 9 are angularly mounted between the frame 3 and the axle 40 to allow lateral movements of the axle 40 with respect to the bearing housing 11 to be made while shocks are absorbed by the stabilization means 7 and 9.

With further reference to FIG. 1, it is seen that the axle 40 has mounted thereon a driven gear 49 which is elongated to substantially the same degree as the degree of elongation of the centrally-located elongated tooth portion 41. The driven gear 49 is enmeshed with a drive gear 51 which is connected via a torque transmission train (not shown) to the engine of the vehicle (not shown). As should be understood, the lateral elongation of the driven gear 49 ensures that regardless of the lateral position of the axle 40 centrally-located elongated tooth portion 43 with respect to the gear-like structure 27, the gears 49 and 51 will always be enmeshed to ensure torque transmission during all positions thereof.

Tires 53 and 55 are shown mounted on the axle 40 and may, if desired, be inflated to a relatively low pressure to compensate for the fact that the present invention does not allow for vertical and front-to-back movements of the axle 40 with respect to the frame 3.

The grooves 25, 29 which capture the bearing 21 prevent lateral movements of the gear-like structure 27 with respect to the bearing housing 11. Thus, any lateral forces which are imposed upon the tires 53, 55 by movements of the vehicle 1 over rough terrain will cause lateral movements of the axle 40 with respect to the gear-like structure 27 without any movements, laterally, of the gear-like structure 27 with respect to the bearing housing 11. When such movements are taking place, the stabilization means 7, 9 are operative to stabilize the vehicle.

As such, an invention has been disclosed in terms of a preferred embodiment which fulfills each and every one of the objects of the invention set forth hereinabove and provides a new and improved all-terrain vehicle axle assembly which allows compensation for lateral forces imposed thereon by movements over rough terrain.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An improved axle assembly comprising:
   (a) a housing mounted on a frame of an associated vehicle;
   (b) a bearing in said housing having a central opening;
   (c) an axle extending through said opening; and
   (d) means interconnecting said axle and bearing for allowing rotation of said axle with respect to said housing as well as lateral translation of said axle with respect to said bearing comprising an elongated toothed surface on said axle and a structure mounted in said bearing and having an opening with an internal toothed surface meshed with said elongated toothed surface to allow rotary torque to be transmitted while allowing lateral movements therebetween.

2. The invention of claim 1, wherein said axle includes two shoulders defining the lateral extent of said elongated toothed surface.

3. The invention of claim 1, further including stabilization means interposed between said frame and axle.

4. The invention of claim 1, further including a driven gear on said axle and a drive gear meshed with said driven gear, one of said drive gear and driven gear being laterally elongated to substantially the same degree of elongation of said elongated toothed surface.

5. The invention of claim 1, wherein said bearing comprises a plurality of circumferentially spaced rollers.

* * * * *